Figure 1:
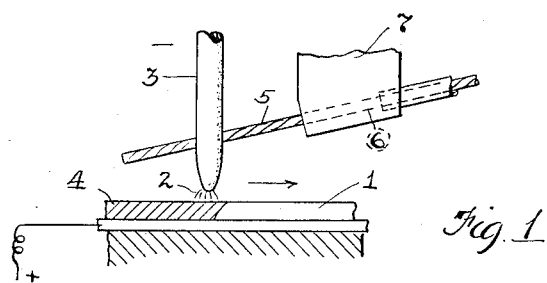

Oct. 25, 1932.     T. E. JERABEK     1,884,712
ARTICLE FOR USE IN ARC WELDING
Filed June 14, 1928

INVENTOR.
Theophil E. Jerabek.
BY
Fay, Oberlin & Fay
ATTORNEYS.

Patented Oct. 25, 1932

1,884,712

UNITED STATES PATENT OFFICE

THEOPHIL E. JERABEK, OF CLEVELAND, OHIO, ASSIGNOR TO THE LINCOLN ELECTRIC COMPANY, OF CLEVELAND, OHIO, A CORPORATION OF OHIO

ARTICLE FOR USE IN ARC WELDING

Application filed June 14, 1928. Serial No. 285,425.

The present invention, relating, as indicated, to a method of electric welding, has more especial reference to metal working and welding processes wherein an arc is drawn between the part or parts to be welded or worked and a carbon electrode which is moved relatively to such parts in order to shift the arc along a line or over a surface in the desired manner.

Due to a number of factors of a variable and somewhat uncertain character, the added metal or welded parts of the metal of the work often present a rough or waved appearance and may contain oxides and other inclusions which detrimentally affect the stress-resisting capabilities of the weld. These objectionable features of the welds heretofore produced are due, in some measure, to more or less erratic behavior of the arc caused by its tendency to stick and shift irregularly, to varying magnetic and electrical influences and to the oxidizing environment or atmosphere in which the welding operation is conducted. This invention, with the object of producing smoother and neater welds having greatly improved physical and chemical characteristics, contemplates effecting the weld in a neutral or reducing atmosphere and in the presence of materials and thermal products of such materials that assist in clearing up the weld, stabilizing the arc, preventing oxidation and the occlusion of injurious gases, and deterring undesired crystalline structure.

More particularly, this invention provides a welding process which involves burning an organic substance, i. e. a carbon-containing substance, in the vicinity of the weld being produced, this substance containing, or being impregnated with, one or more other materials of a usually inorganic character and producing, when consumed or thermally activated, a neutral or reducing atmosphere in blanketing relation to the weld, this atmosphere, it is believed, excluding detrimental gases such as nitrogen and oxygen, eliminating or minimizing arc fluctuations and contributing to the production of smoother and more uniform welds whose ductility and malleability surpass those of the metal in the body of the work and whose content of oxides and other foreign inclusions is much smaller than that of the welds produced by the arc welding process as now practiced.

To the accomplishment of the foregoing and related ends, said invention, then, consists of the means hereinafter fully described and particularly pointed out in the claims; the annexed drawing and the following description setting forth in detail certain means and one mode of carrying out the invention, such disclosed means and mode illustrating, however, but several of various ways in which the principle of the invention may be used.

In said annexed drawing:—

Figure 2:
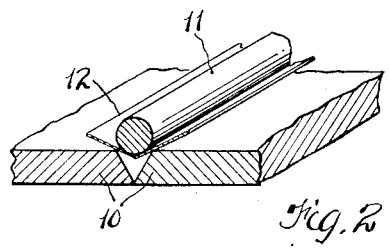

Fig. 1 is a diagrammatic view illustrating one method and suitable apparatus for carrying out this invention; and Fig. 2 is a section showing a varient of the process.

In the drawing, and with particular reference to Fig. 1, the process constituting the present invention is shown as applied to a seam welding operation in which the abutting or contiguously positioned edges of two plates 1 are being interfused by an arm 2 drawn between a carbon or non-metallic cathode 3 and the work. It will be understood that the electrode 1 and the work are relatively moved in order to advance the arc progressively along the seam and that a predetermined spacing is maintained between the work and the electrode so that successive parts 4 of the weld shall be uniform and the arc at its length of greatest efficiency.

As the welding progresses, a "rope" or strip 5 is fed either automatically or manually through the bore 6 of a bracket or tube 7. This strip, being of a preferably organic or carbonaceous material, may conveniently be made by twisting paper or other fibrous stock into a string or rope such as that illustrated, and in the intense heat of the arc burns to form gases such as carbon monoxide and carbon dioxide which envelop or blanket the arc and the fused metal of the work to thereby exclude atmospheric gases and prevent oxidation and absorption of nitrogen. This burning strip also has a favorable action in preventing the molten metal from solidifying in wavelets or ridges and in minimizing arc fluctuations, but these objects may be attained in still greater degree by using a material containing one or more other substances which have been found to have a very beneficial effect.

It has been discovered that materials such as compounds of the alkali metals lithium, sodium, potassium, rubidium, cæsium and radium, when incorporated in the strip 5, have a most beneficial action in cleaning up the weld, stabilizing the arc and improving the appearance of the congealed metal. These materials, in the form of salts, such as silicates or carbonates for example, may be incorporated in the strip 5 in any suitable manner which will produce uniform impregnation as, for instance, by adding a solution to the beater in which the paper stock is prepared or the liquid through which the paper is drawn before being twisted, the procedure adopted being immaterial if the distribution of the material and its quantity are satisfactorily controlled. The exact action of the burning strip and the function of the impregnating chemicals is not, at present, completely understood, but the results obtained are apparently, at least in part, attributable, not only to the neutral or reducing atmosphere created, but also to a relatively higher anodic drop and a correspondingly lower cathodic drop in the path traversed by the arc.

In Fig. 2 another way of carrying out this improved process is illustrated. In this view the two sheets 10 have their adjacent edges beveled and a rod 11 is placed in the resulting groove, this rod, during the welding operation, being melted and fused with the metal of the sheets. Interposed between the rod 11 and the groove in which it rests is a strip of paper or the like 12, this strip being impregnated similarly to the "rope" previously described and having substantially the same effect in preventing oxidation, stabilizing the arc and improving the appearance of the weld produced. The rod 11 may be melted down by an arc in the manner shown in Fig. 1 and, of course, the strip 12 is burned in about the same way as the "strip" 5.

If desired, electromagnetic or other means may be used for assisting in controlling the arc, this means conveniently taking the form of a solenoid coil surrounding, or in close proximity to, the arc, and so connected either in series or otherwise that compensating influences are established which prevent or arrest tendencies to variation however caused, and therefore further contribute to the production of welds having smoother exposed surfaces and a smaller content of damaging impurities.

Other modes of applying the principle of this invention may be employed instead of the one explained, change being made as regards the means and the steps herein disclosed, provided those stated by any of the following claims or their equivalent be employed.

I therefore particularly point out and distinctly claim as my invention:—

1. As an article of manufacture for use in arc welding, a cord of combustible material carrying fluxing and alloying ingredients and capable of being fed into the arc area independently of the electrode and the work.

2. As an article of manufacture for use in arc welding, a cord of combustible material carrying fluxing material and capable of being fed into the arc area independently of the electrode and the work.

3. As an article of manufacture for use in arc welding, a cord of combustible material carrying alloying material and capable of being fed into the arc area independently of the electrode and the work.

4. As an article of manufacture for use in arc welding, a cord of combustible material carrying arc stabilizing material and capable of being fed into the arc area independently of the electrode and the work.

5. As an article of manufacture for use in arc welding, a cord of combustible material, carrying material adapted to increase the deoxidizing effect of such cord when consumed in the arc area, and said cord capable of being fed into the arc area independently of the electrode and the work.

Signed by me, this 11th day of June, 1928.

THEOPHIL E. JERABEK.